US008707533B2

(12) United States Patent
Livingston et al.

(10) Patent No.: US 8,707,533 B2
(45) Date of Patent: Apr. 29, 2014

(54) SINGLE BRAKE SPRING TOOL AND METHOD OF REMOVAL OF DRUM BRAKE SPRING

(75) Inventors: Ken D. Livingston, Collinsville, OK (US); Randall J. Ploeger, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 314 days.

(21) Appl. No.: 13/279,930

(22) Filed: Oct. 24, 2011

(65) Prior Publication Data

US 2013/0097837 A1 Apr. 25, 2013

(51) Int. Cl.
*B23P 19/00* (2006.01)
*B23P 19/04* (2006.01)
*B60P 1/48* (2006.01)

(52) U.S. Cl.
USPC ................ 29/426.6; 29/225; 29/233; 29/267; 29/278; 29/426.5; 29/426.4; 254/10.5

(58) Field of Classification Search
USPC ........... 29/225, 226, 227, 228, 229, 230, 233, 29/238, 239, 267, 270, 278, 402.03, 426.1, 29/426.4, 426.5, 426.6; 254/10.5
See application file for complete search history.

(56) References Cited

U.S. PATENT DOCUMENTS 1,563,000 A * 11/1925 Wajer et al. ................... 294/169
1,598,561 A * 8/1926 Coomer ............................ 81/64
1,862,172 A * 6/1932 Bennett ........................... 29/230
2,489,934 A * 11/1949 Schwinn ......................... 192/64
2,490,160 A * 12/1949 Riccio ............................. 29/227
3,891,185 A * 6/1975 Lett ............................. 254/10.5
4,870,737 A * 10/1989 Navarro .......................... 29/227
4,976,022 A * 12/1990 Thornton et al. ............... 29/227
5,003,680 A * 4/1991 Vesely et al. .................... 29/227
5,095,603 A * 3/1992 Carruthers et al. ............. 29/227
5,165,154 A * 11/1992 Miller ............................. 29/227
5,345,664 A * 9/1994 McMahon et al. ......... 29/402.08
5,367,755 A * 11/1994 Wood .............................. 29/227
5,455,996 A * 10/1995 Ploeger et al. ............. 29/402.08
5,477,598 A * 12/1995 Borner, Jr. ...................... 29/227
5,659,936 A * 8/1997 Ploeger et al. ................. 29/227
6,044,535 A 4/2000 Strickland
6,108,882 A * 8/2000 Hodgson ......................... 29/227
6,327,769 B1 12/2001 Strickland
7,032,280 B1 4/2006 Ploeger
7,676,896 B1 * 3/2010 Carscadden .................... 29/227
7,954,217 B2 * 6/2011 Wu ................................ 29/235
2006/0005366 A1 * 1/2006 Ploeger ........................... 29/225
2012/0304431 A1 * 12/2012 Zachary .......................... 29/225

OTHER PUBLICATIONS

GM Brake Shoe Spanner and Spring Remover No. J38400, p. 70.
Lisle Product No. 49900 GM Single Spring Brake Tool, p. 2.

(Continued)

*Primary Examiner* — Essama Omgba
(74) *Attorney, Agent, or Firm* — Banner & Witcoff, Ltd.

(57) ABSTRACT

A brake drum spring release tool includes a straight elongate rod member with a laterally projecting lever arm extending from one side and an extended hook member from the end of the rod member. The lever arm acts as a fulcrum when positioned on a drum brake spring simultaneously engaged by a hook member. Placing a generally lateral force on the grip end of the tool will cause rotational force imparted by the hook member on the spring typically with a mechanical advantage associated with the fulcrum of the lever arm to thereby release the spring from a drum brake shoe.

19 Claims, 4 Drawing Sheets

(56) References Cited

OTHER PUBLICATIONS

Lisle Product No. 50600 Single Spring Brake Tool.

Invention Disclosure Agreement, submission No. 10-269, Jul. 26, 2010, Ken Livingston, “Brake Spring Removal/Installation Tool for Rear Drum Brakes with ‘W’ Spring”.

* cited by examiner

SINGLE BRAKE SPRING TOOL AND METHOD OF REMOVAL OF DRUM BRAKE SPRING

BACKGROUND OF THE INVENTION

In a principal aspect the present invention relates to a tool for removal of a generally W-shaped drum brake spring by engagement and retraction of the spring from a drum brake shoe mounted in a brake housing of a vehicle.

The maintenance of drum brakes for vehicles typically requires that the drum brake pads be replaced or rejuvenated from time to time. In order to accomplish such a repair operation, it becomes necessary typically to remove the W-shaped brake spring that engages a pair of drum brake shoes. Various prior art patents disclose tools to effect such a removal including the following: U.S. Pat. No. 6,0445,535 issued Apr. 4, 2000 entitled "Brake Spring Maintenance Tool and Method"; U.S. Pat. No. 6,327,769 issued Dec. 11, 2001 entitled "Brake Spring Maintenance Tool and Method"; and U.S. Pat. No. 7,032,280 issued. Apr. 25, 2006 entitled "Single Brake Spring Tool and Method". Each of the aforesaid patents is incorporated herewith by reference in their entirety.

Generally, such prior art tools include a mechanism which is fastened to the brake assembly in a manner which permits engagement of hooks mounted on a bracket to be adjusted and engaged with the W-shaped drum brake spring. Manipulation of the bracket as well as the hook members facilitates their removal or disengagement of the W-shaped brake spring from the drum brake shoe. Such tools have been commercialized, for example, by Lisle Corporation, as their Product No. 49900 and Lisle Product No. 50600.

While such tools are very useful and have been successfully utilized by many mechanics for their intended purpose, certain disadvantages may result. For example, removal of springs by the use of such tools may be especially time consuming. That is, the time to set up such tools and adjust them for their intended purpose may be excessive. Thus, there has developed a need to provide tools which have the objective of disengagement or removal of a brake spring associated with drum brakes, but which make the repair protocol more easily and successfully accomplished.

SUMMARY OF THE INVENTION

Briefly, the present invention comprises a tool as well as a method of use and implementation of the tool which effects the engagement and removal of a single brake spring from a drum brake shoe so that the drum brake shoe may be easily replaced. The tool comprises an elongate rod member which is substantially straight and which includes a grip end and an opposite hook and lower arm end. A lever arm extends generally laterally or at an angle from the hook and lever arm end at an acute angle relative to the elongate rod member. The lever arm terminates at its outer tip with a slot that extends transversely to the axis of a longitudinal rod member. A hook member also extends from the hook and lower arm end of the rod generally in a longitudinal axially direction of the straight elongate rod member. The hook member also terminates with a slot that is transverse to the longitudinal axis of the elongate rod member. Thus, the lever arm as well as the hook member each terminates in or with a slot that is transverse to the longitudinal axis of the rod member and the slots are aligned axially. The slot at the tip of the lever arm is opened outwardly at its distal end. The slot in the hook member is positioned in one side of the hook member.

As a consequence of the design of the respective slots, the slot of the lever arm may be inserted or engaged with a part of the brake spring distal from the end of the spring while at the same time the hook member is engaged at or near the free end of the brake spring. Thus, the lever arm when engaged with the brake spring serves as a fulcrum such that when a lateral force is applied to the rod member, that force will pull or bend and remove the end of the brake spring member from engagement with a brake drum shoe. The relative angle of the lever arm to the hook member, the alignment of the slots of the lever arm and the hook member and the dimensional characteristics of the various members provides a mechanical advantage to enable easy removal of the drum brake spring from a brake shoe. The amount of time to place the tool in contact with the drum brake components is incidental relative to the prior art inasmuch as all that is required is alignment of the slots with various parts of the drum brake spring. Further, the mechanical force to effect disengagement of the drum brake spring from the brake shoe is enhanced by virtue of the relationship of the length of the rod member to the length of the hook member. Thus, it is an aspect of the invention to provide an improved drum brake spring removal tool.

It is a further object and aspect of the invention to provide a drum brake spring removal tool which requires minimal time to position and engage a drum brake spring and then effect its removal from a brake shoe.

Another object and aspect of the invention is to provide a drum brake spring removal tool which is inexpensive, rugged, easy to use and which provides adequate mechanical advantage with respect to its use.

A further object of the invention is to provide a brake spring removal tool which may be easily manufactured from typical stock materials and which may be easily repaired and adjusted by removal or replacement of the minimal parts employed in the manufacture and use of the tool.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF EMBODIMENTS OF THE INVENTION

Figure 1:
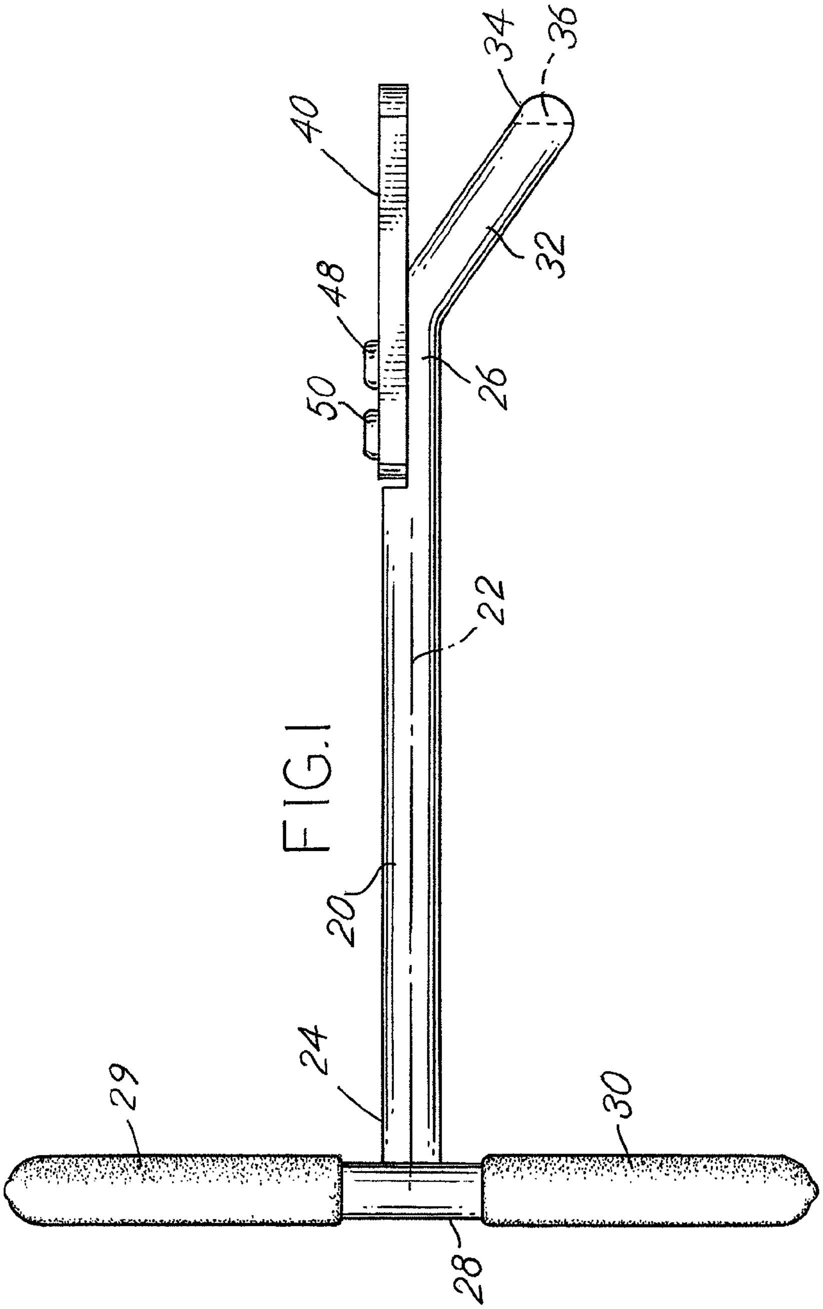
FIG. 1 is a plan view of the tool of the invention.
Figure 2:
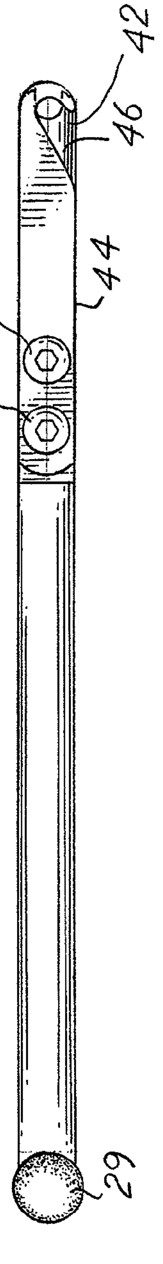
FIG. 2 is a side elevation of the tool of FIG. 1.
Figure 3:
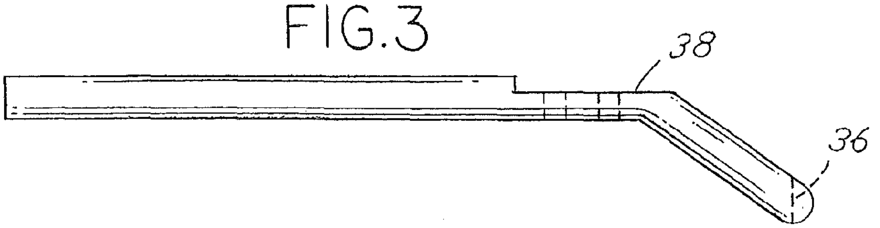
FIG. 3 is a plan view of the rod member and lever arm of the tool of the invention as depicted in FIG. 1.
Figure 4:
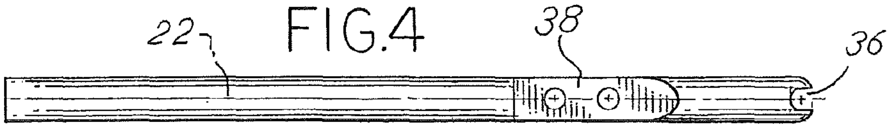
FIG. 4 is a side elevation of the rod member and lever arm of FIG. 3.

Referring to the figures, FIGS. 1-6 illustrate the component parts and construction of the tool of the invention. FIGS. 7-10 illustrate the method of use of the tool.

Referring to FIGS. 1-6, the tool is comprised of elongate rod member 20 having elongate, generally straight axis 22. The elongate rod member 20 includes a grip end 24 and an opposite hook and lever arm end or section 26. The rod member 20 is typically a cylindrical steel rod that comprises a shaft for the tool. The grip end 24 typically includes a handle 28 which facilitates manual gripping and manipulation of the tool. Molded plastic grips, such as grips 29 and 30, may be fastened to the handle 28 which is welded transversely to the rod member 20.

A lever arm 32 extends generally laterally from the hook and lever arm end 26. The lever arm 32 is generally straight and forms an acute angle with respect to the axis 22. A typical range of the acute angle is 35°±7°. The length of the lever arm 32 relative to the length of the straight line section of the rod member 20 is typically in the range of about 1 to 3. However, that range is not necessarily a limiting feature of the invention. The length of the rod member 20 in its straight line section provides an additional mechanical advantage as the length is increased relative to a hook member 40 as described hereinafter.

The tip end 34 of the lever arm 32 includes a first slot 36. The first slot 36 is transverse or generally normal to the axis 20. The first slot 36 opens outwardly in the direction of the longitudinal axis 20 as depicted for example in FIG. 4. The rod member 20 and the lever arm 32 are integral or unitary members in the disclosed embodiment, but may be separate elements.

The rod 20 is machined or formed at its hook and lever arm end or section 26 to provide a flat 38 which is designed to receive a rectangular cross section, straight elongate hook member 40. The hook member 40 is a separate component in the embodiment disclosed. This facilitates replacement of the hook member 40 should it be damaged or requires replacement with a member made from a different material or having different cross section or having a different configuration of a second slot 42. That is, the hook member 40 extends in the direction of the axis 20 and includes a second slot 42 which is also transverse or generally normal to the axis 20. Second slot 42 opens along a lateral side of the hook member 40. Thus, the hook member 40 second slot 42 in the surface 44 enables the first and second slots; namely, the slot 36 and the slot 42 to both be aligned axially and generally transverse to the axis 20. The second slot 42 in the hook member 40 includes an open side 46 oriented or directed generally in the direction of the grip end 24 of the rod member 20.

The hook member 40 is as previously indicated, made from stock which has a generally rectangular cross section which facilitates the attachment by first and second fasteners 48 and 50; namely, bolts 48 and 50 to the flat 38. The use of bolts 48 and 50 or other fasteners enables easy replacement of the hook member 40. Thus, a distinct material or shape or configuration of the hook member 40 may be utilized depending upon the size or character of a spring member of a drum brake construction. The size and configuration of slot 42 may also be altered inasmuch as the hook member 40 is replaceable.

Figure 5:
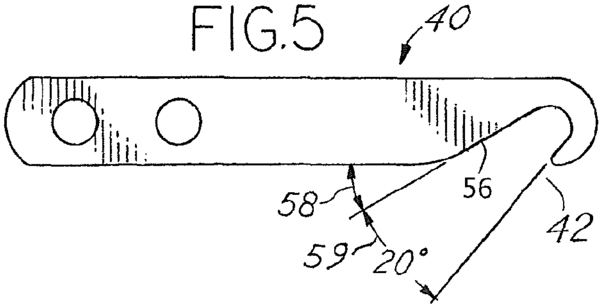
FIG. 5 is a plan view of the hook member of the tool of the invention.
Figure 6:
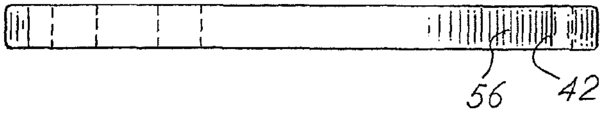
FIG. 6 is a side elevation of the hook member of FIG. 5.

The opening 46 of the second slot 42 is a divergent opening. That is, the slot 42 opens and the sides of the slot 42 diverge at a divergent angle 59 of, by way of example, 20° as depicted in FIG. 5. Further, the inner side 56 of the slot 42 typically forms an angle, for example, angle 58 with axis 22 of about 30° and typically in the range of about 25° to 45° to thereby insure that the slot 42 will be directed toward the grip end 24. This is in contrast to the opening of the first slot 36 in the lever arm 32 which is uniform and which is transverse to the axis 20 and open in the direction of the axis 20.

Figure 7:
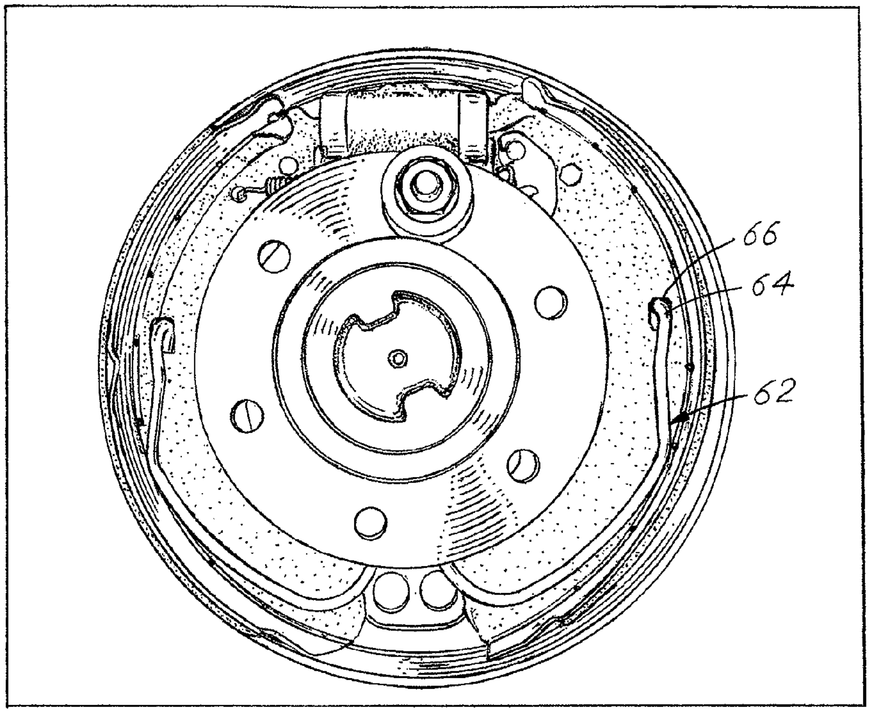
FIG. 7 is an isometric view of a typical drum brake assembly.
Figure 8:
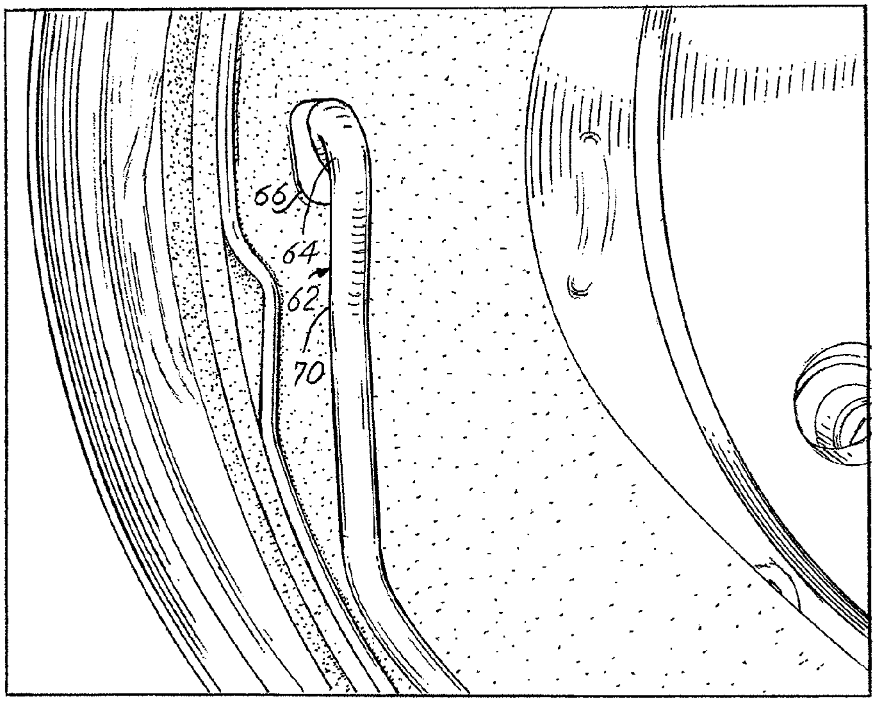
FIG. 8 is an isometric view of a drum brake spring inserted and engaged with a drum brake shoe of a drum brake assembly as depicted in FIG. 7.

FIGS. 7-10 illustrate the method of use of the tool of the invention. Referring first to FIG. 7, there is depicted a typical drum brake assembly with a spring member or drum brake spring 62 having a distal end 64 which fits through an opening in a brake shoe; namely, opening 66. The tool of FIGS. 1-6 may be used to remove the distal end 64 from the opening 66. FIG. 8 depicts in greater detail the opening 66 with the distal end 64 of the spring 62. A section 70 is located adjacent to the distal end 64.

Figure 9:
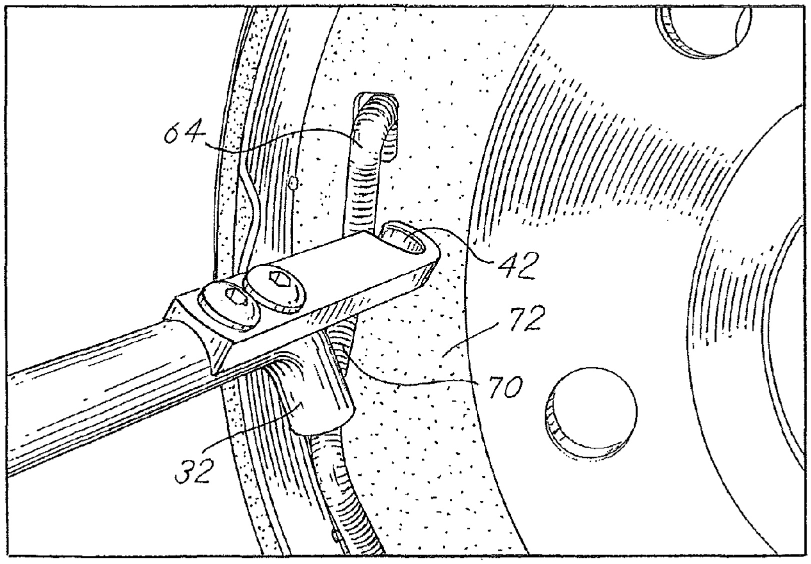
FIG. 9 is an isometric view depicting positioning of the tool of the invention on a brake drum spring which has been installed in a brake assembly and further depicting the method of use of the tool.

Referring next to FIG. 9, there is depicted positioning of the tool. Specifically, the first slot 36 of the lever arm 32 is fitted over the adjacent section 70 of the spring 62. The second slot 42 is fitted over the distal end 64 of the spring 62. The rod member 20 extends outwardly from the brake drum shoe 72.

Figure 10:
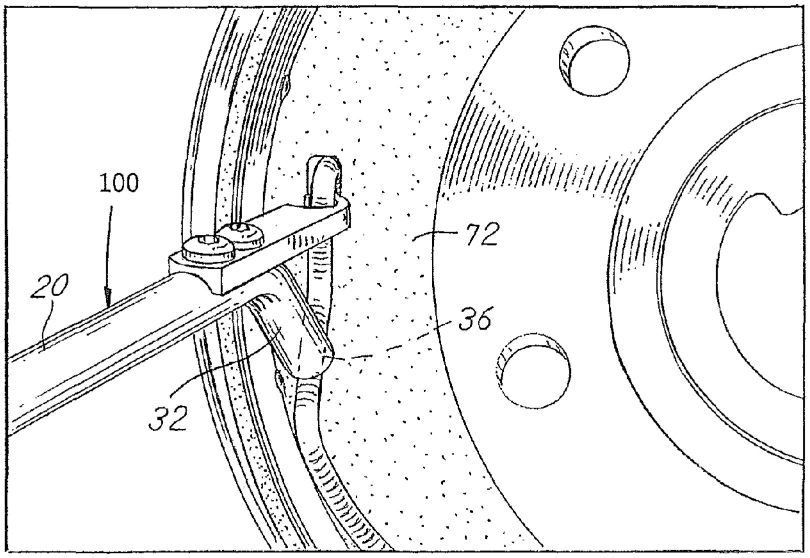
FIG. 10 is an isometric view depicting the final placement of the tool depicted in FIG. 9.

As depicted in FIG. 10, the rod member 20 may then be manually engaged and moved in the direction of the arrow 100 to utilize the lever arm 32 as a fulcrum with the hook member 40 engaged with the distal end 64 of the spring 62 to thereby release the distal end 64 from the opening 66. This procedure may be used to disengage each end of the spring 62 from the shoe 72. The tool may also be utilized to manipulate the spring 62 and reverse the operation inasmuch as it can be used to bend the spring 62 and facilitate its movement and engagement with the appropriate opening 66.

The size and dimension of the various component parts of the tool and the choice of the stock material may be varied without departing from the spirit and scope of the invention. The construction of the hook member 40, as well as the lever arm 32 and the rod member 20 may also be varied. Further, the angular relationship between the component parts may be varied. The utilization of the component parts may be unitary and interval as described in the embodiment, or they may be separated into their relative described component parts. The dimensional characteristics of the component parts may also be varied to accommodate variable types of drum brake assemblies and to alter the mechanical advantage of the tool. Also, an extension may be attached to rod member 20 to alter the mechanical advantage of the tool.

Further, prepositions, adjectives and adverbs are not to be considered as limiting aspects of the description of the invention or the scope and meaning of the claims of the invention. Thus, the invention is to be limited only by the following claims and equivalents thereof.

What is claimed is:

1. A single brake spring release tool comprising:

a substantially straight, elongate rod member having a substantially straight longitudinal axis extending between a rod grip end and an opposite hook and lever arm end section;

a lever arm extending from the hook and lever arm end section of said rod member at an acute angle relative to the substantially straight longitudinal axis of the rod member; said lever arm terminating at an outer fulcrum tip and including a first spring engaging slot extending and open outwardly from the outer tip in the direction of the longitudinal rod member axis; and a hook member attached to and extending longitudinally from the hook and lever arm end section of the rod member along the straight longitudinal axis, said hook member including a second spring engaging slot in a side thereof generally transverse to said straight longitudinal axis, said second spring engaging slot generally aligned with said first spring slot of said lever arm transversely to the longitudinal axis.

2. The tool of claim 1 wherein the rod member and lever arm are a unitary integral member.

3. The tool of claim 2 wherein the hook member is a separate member attached by a fastener element to said rod member.

4. The tool of claim 3 wherein said fastener element comprises a removable bolt.

5. The tool of claim 2 including a manual handle at the rod grip generally transverse to the longitudinal axis.

6. The tool of claim 1 including a manual handle at the rod grip.

7. The tool of claim 1 wherein said hook member is comprised of rectangular stock material.

8. The tool of claim 1 wherein said acute angle is in the range of about 35°±7°.

9. The tool of claim 1 wherein said hook member second slot comprises an opening oriented at least partially in the direction of said grip end of said rod member.

10. A method for effecting removal of a generally W-shaped drum brake spring having first and second spaced legs, each leg including a distal end for engagement with a drum brake shoe and an adjacent section, said spring in biasing engagement with a brake drum shoe mounted on a brake backing plate, said method comprising the steps of:

providing a substantially straight, elongate rod member having a substantially straight longitudinal axis extending between a rod grip end and an opposite hook and lever arm end section;

a lever arm extending from the hook and lever arm end section of said rod member at an acute angle relative to the substantially straight longitudinal axis of the rod member; said lever arm terminating at an outer fulcrum tip and including a first spring engaging slot extending and open outwardly from the outer tip in the direction of the straight longitudinal rod member axis;

a hook member attached to and extending longitudinally from the hook and lever arm end section of the rod member along the straight longitudinal axis, said hook member including a second spring engaging slot in a side thereof generally transverse to said straight longitudinal axis, said second spring engaging slot generally aligned with said first spring slot of said lever arm transversely to the longitudinal axis;

positioning the lever arm extension first spring engaging slot on the adjacent section of one of said spring legs to provide a fulcrum;

positioning said second spring engaging slot of said hook member on said distal end of said one of said spring legs to engage said spring in tension by the lever arm;

engaging said rod grip end of said rod member and pivoting said rod grip end about the fulcrum to disengage the distal end of said one of said spring legs from the drum brake shoe.

11. A single brake spring release tool comprising:

a substantially straight, elongate rod member having a substantially straight longitudinal axis extending between a rod grip end and an opposite hook and lever arm end section;

a lever arm extending from the hook and lever arm end section of said rod member at an acute angle relative to the substantially straight longitudinal axis of the rod member; said lever arm terminating at an outer fulcrum tip and including a first spring engaging slot extending with a slot opening in the direction of the longitudinal rod member axis; and a hook member extending from the hook and lever arm end section of the rod member in the direction of the straight longitudinal axis, said hook member including a second spring engaging slot in a side thereof having an opening generally transverse to said straight longitudinal axis and directed generally toward the grip end, said second spring engaging slot generally aligned with said first spring engaging slot of said lever arm and with the longitudinal axis.

12. The tool of claim 11 wherein the rod member and lever arm are a unitary integral member.

13. The tool of claim 12 wherein the hook member is a separate member attached by a fastener element to said rod member.

14. The tool of claim 11 including a manual handle at the rod grip.

15. The tool of claim 12 including a manual handle at the rod grip generally transverse to the longitudinal axis.

16. The tool of claim 11 wherein said hook member is comprised of rectangular stock material.

17. The tool of claim 11 wherein said acute angle is in the range of about 35°7°.

18. The tool of claim 11 wherein the second spring engaging slot includes divergent sides.

19. A method for effecting removal of a generally W-shaped drum brake spring having first and second spaced legs, each leg including a distal end for engagement with a drum brake shoe and an adjacent section, said spring in biasing engagement with a brake drum shoe mounted on a brake backing plate, said method comprising the steps of:

providing a single brake spring release tool comprising:

a substantially straight, elongate rod member having a substantially straight longitudinal axis extending between a rod grip end and an opposite hook and lever arm end section;

a lever arm extending from the hook and lever arm end section of said rod member at an acute angle relative to the substantially straight longitudinal axis of the rod member; said lever arm terminating at an outer fulcrum tip and including a first spring engaging slot extending with a slot opening in the direction of the longitudinal rod member axis; and a hook member extending from the hook and lever arm end section of the rod member in the direction of the straight longitudinal axis, said hook member including a second spring engaging slot in a side thereof having an opening generally transverse to said straight longitudinal axis and directed generally toward the grip end, said second spring engaging slot generally aligned with said first spring engaging slot of said lever arm and with the longitudinal axis;

positioning the lever arm extension first spring engaging slot on the adjacent section of one of said spring legs to provide a fulcrum;

positioning said second spring engaging slot of said hook member on said distal end of said one of said spring legs to engage said spring in tension by the lever arm;

engaging said rod grip end said rod member and pivoting said rod grip end about the fulcrum to disengage the distal end of said one of said spring legs from the drum brake shoe.

* * * * *